(12) United States Patent
Means et al.

(10) Patent No.: US 12,184,540 B2
(45) Date of Patent: Dec. 31, 2024

(54) ENCAPSULATING NETWORK PERFORMANCE METRICS IN BORDER GATEWAY PROTOCOL TO SUPPORT CUSTOMER-DRIVEN PATH SELECTION

(71) Applicant: AT&T Intellectual Property I, L.P., Atlanta, GA (US)

(72) Inventors: Israel Means, Chula Vista, CA (US); Adrian Cepleanu, Phoenix, AZ (US); Praveen Ramadenu, Manalapan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 161 days.

(21) Appl. No.: 17/808,090

(22) Filed: Jun. 21, 2022

(65) Prior Publication Data

US 2023/0412498 A1    Dec. 21, 2023

(51) Int. Cl.
*H04L 45/42* (2022.01)
*H04L 43/12* (2022.01)
*H04L 45/12* (2022.01)
*H04L 45/24* (2022.01)

(52) U.S. Cl.
CPC ............. *H04L 45/42* (2013.01); *H04L 43/12* (2013.01); *H04L 45/123* (2013.01); *H04L 45/24* (2013.01)

(58) Field of Classification Search
CPC ....... H04L 45/42; H04L 43/12; H04L 45/123; H04L 45/24
See application file for complete search history.

(56) References Cited

U.S. PATENT DOCUMENTS

| | | | |
|---|---|---|---|
| 11,381,474 B1* | 7/2022 | Kumar | ................ H04L 41/0897 |
| 2002/0145981 A1* | 10/2002 | Klinker | ................. H04L 45/124 370/244 |
| 2022/0393967 A1* | 12/2022 | Solanki | ............... H04L 12/4641 |

* cited by examiner

*Primary Examiner* — Fadi Haj Said (57) ABSTRACT

In one example, a method includes receiving a plurality of network probes originating from a first provider edge router in a service provider network, calculating a plurality of network performance metrics, based on the plurality of network probes, and storing the network performance metrics associated with each network probe of the plurality of network probes in a path metric table, wherein an entry in the path metric table for the each network probe includes a path traveled by the each network probe from the first provider edge router to the processing system, the network performance metrics associated with the each network probe, a community value associated with the each network probe, and a traffic classification value associated with the each network probe.

20 Claims, 7 Drawing Sheets

| PATH — 302₁ | METRICS — 302₂ | BGP COMMUNITY — 302₃ | DSCP — 302₄ |
|---|---|---|---|
| a,b | Latency = w<br>Jitter = x<br>Packet Loss = y<br>Congestion = z | 1:1 | 1 |
| c,e,g | Latency = w1<br>Jitter = x1<br>Packet Loss = y1<br>Congestion = z1 | 1:2 | 2 |

ENCAPSULATING NETWORK PERFORMANCE METRICS IN BORDER GATEWAY PROTOCOL TO SUPPORT CUSTOMER-DRIVEN PATH SELECTION

The present disclosure relates generally to the routing of network traffic, and relates more particularly to devices, non-transitory computer-readable media, and methods for encapsulating network performance metrics in border gateway protocol to support customer-driven path selection.

BACKGROUND

In packet-switched networks, routing is the process of selecting a path across a network in order to deliver network traffic (e.g., data packets) from a source to a destination. Routing decisions are typically made by routers, i.e., specialized pieces of network hardware which use routing tables and routing protocols in order to identify the best paths for the network traffic. A best path may be identified based on a set of static routes or may be identified dynamically based on variable metrics such as number of hops, latency, packet loss, and the like. A router may perform this process millions of times per second for millions of packets.

SUMMARY

In one example, the present disclosure describes a device, computer-readable medium, and method for encapsulating network performance metrics in border gateway protocol to support customer-driven path selection. For instance, in one example, a method includes receiving a plurality of network probes originating from a first provider edge router in a service provider network, calculating a plurality of network performance metrics, based on the plurality of network probes, and storing the network performance metrics associated with each network probe of the plurality of network probes in a path metric table, wherein an entry in the path metric table for the each network probe includes a path traveled by the each network probe from the first provider edge router to the processing system, the network performance metrics associated with the each network probe, a community value associated with the each network probe, and a traffic classification value associated with the each network probe.

In another example, a non-transitory computer-readable medium stores instructions which, when executed by a processing system of including at least one processor, cause the processing system to perform operations. The operations include receiving a plurality of network probes originating from a first provider edge router in a service provider network, calculating a plurality of network performance metrics, based on the plurality of network probes, and storing the network performance metrics associated with each network probe of the plurality of network probes in a path metric table, wherein an entry in the path metric table for the each network probe includes a path traveled by the each network probe from the first provider edge router to the processing system, the network performance metrics associated with the each network probe, a community value associated with the each network probe, and a traffic classification value associated with the each network probe.

In another example, an apparatus includes a processing system including at least one processor and a non-transitory computer-readable medium storing instructions which, when executed by the processing system, cause the processing system to perform operations. The operations include receiving a plurality of network probes originating from a first provider edge router in a service provider network, calculating a plurality of network performance metrics, based on the plurality of network probes, and storing the network performance metrics associated with each network probe of the plurality of network probes in a path metric table, wherein an entry in the path metric table for the each network probe includes a path traveled by the each network probe from the first provider edge router to the processing system, the network performance metrics associated with the each network probe, a community value associated with the each network probe, and a traffic classification value associated with the each network probe.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure provides a system, method, and non-transitory computer readable medium for encapsulating network performance metrics in border gateway protocol to support customer-driven path selection. As discussed above, routing is the process of selecting a path across a packet-switched network in order to deliver network traffic (e.g., data packets) from a source to a destination. Routing decisions are typically made by routers, i.e., specialized pieces of network hardware which use routing tables and routing protocols in order to identify the best paths for the network traffic. A best path may be identified based on a set of static routes or may be identified dynamically based on variable metrics such as number of hops, latency, packet loss, and the like. A router may perform this process millions of times per second for millions of packets.

Examples of the present disclosure present a metric-based forwarding scheme that extends the use of border gateway protocol (BGP) and differentiated services code point (DSCP) in order to expose internal network performance metrics to customer devices, thereby allowing the customer devices to select the paths that network traffic will travel. In one example, the metric-based forwarding scheme is based on the expanded use of BGP community values (CVs) and DSCP. In one example, BGP CVs are used as pointers for specific network performance metrics, while DSCP is leveraged to steer network traffic to specific paths that are characterized by specific performance metrics. Ultimately, BGP may be used to convey a DSCP setting to achieve the performance associated with metrics encapsulated within a BGP CV.

Examples of the present disclosure can be further extended to enable evolved interactions between BGP and software defined network (SDN) controllers. For instance, extending BGP to encapsulate network performance metrics and the path-key construct may allow new functions that have not yet been exploited. As an example, the path-key function may expand the use of route distinguishers and permit the encoding of new information and mitigating path decisions in route distinguishers that would otherwise result in the suppression of certain routes. In further examples, the path-key construct may enable the use of a unique value in a route distinguisher field of a virtual private network (VPN) which may allow both nominal and diversion paths to reach an endpoint router (whereas the diversion path would typically intercept the nominal path). These and other aspects of the present disclosure are discussed in further detail with reference to FIGS. 1-7, below.

Figure 1:
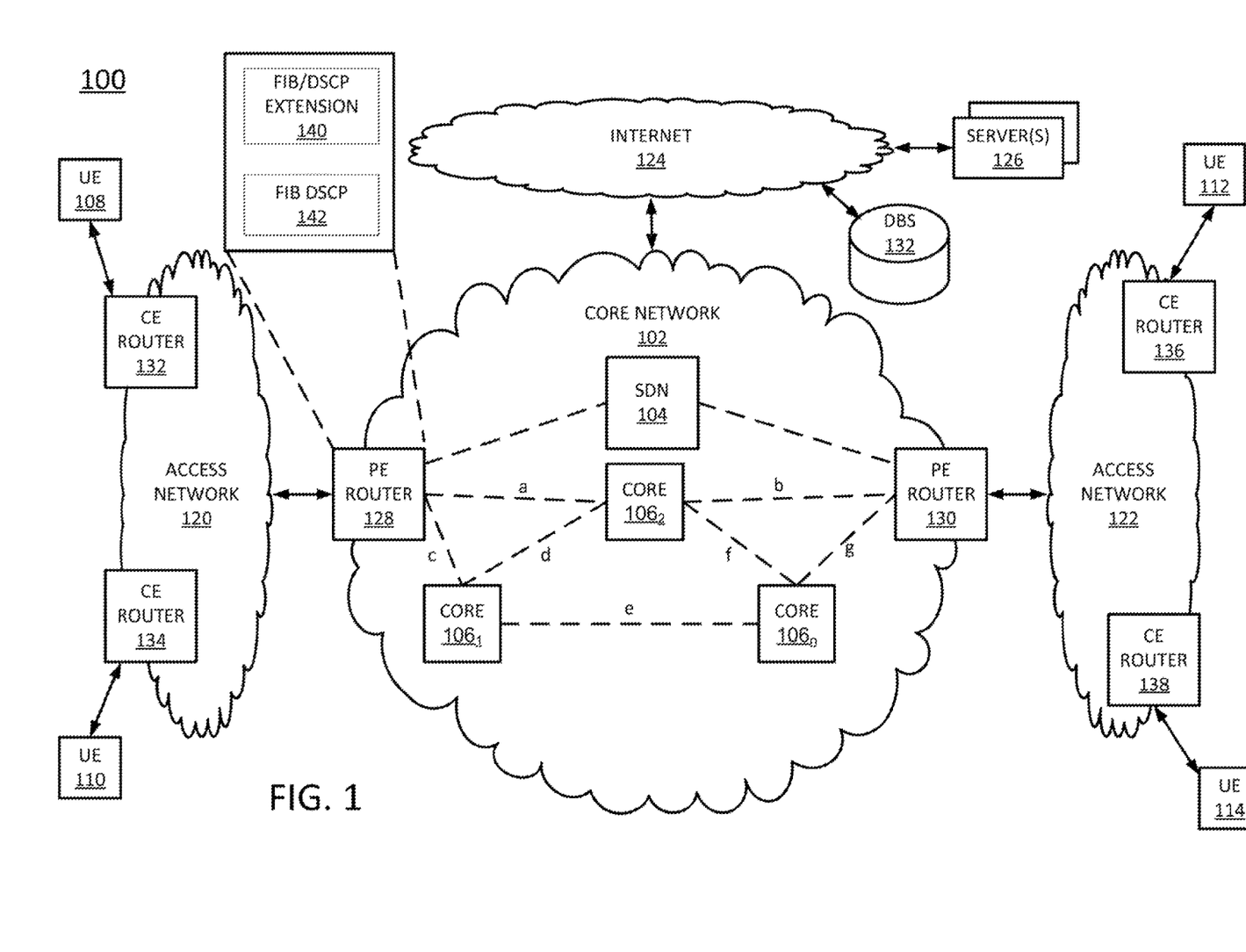
FIG. 1 illustrates an example system in which examples of the present disclosure for encapsulating network performance metrics in border gateway protocol to support customer-driven path selection may operate.

To further aid in understanding the present disclosure, FIG. 1 illustrates an example system 100 in which examples of the present disclosure for encapsulating network performance metrics in border gateway protocol to support customer-driven path selection may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include a plurality of network elements (NEs), including a software defined networking (SDN) controller 104 and a plurality of routers for routing data packets between user endpoint devices 108, 110, 112, and 114.

The plurality of routers may include at least a first provider edge (PE) router 128 and a second provider edge (PE) router 130 and a plurality of intermediate (or core) routers $106_1$-$106_n$ (hereinafter individually referred to as an "intermediate router 106" or collectively referred to as "intermediate routers 106"). A plurality of network segments or links a-g connect the first provider edge router 128, the second provider edge router 130, and the plurality of intermediate routers 106. Thus, a data packet traversing the core network from the first provider edge router 128 to the second provider edge router 130 may travel one of a plurality of possible paths. For instance, the data packet could travel a path a,b (comprising network links a and b and intermediate router $106_2$); a path c,e,g (comprising network links c, e, and g and intermediate routers $106_1$ and $106_n$); a path c,d,f,g (comprising network links c, d, f, and g and intermediate routers $106_1$, $106_2$, and $106_n$), or other paths. Each path of the plurality of possible paths may exhibit different network performance parameters (e.g., latency, jitter, packet loss, congestion, etc.). Thus, the path taken by the data packet may affect how quickly and reliably the data packet reaches the second provider edge router 130.

Although two provider edge routers (i.e., first provider edge router 128 and second provider edge router 130) are illustrated in FIG. 1, the core network 102 may include any number of provider edge routers, as well as any number of intermediate routers 106. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The user endpoint devices 108, 110, 112, and 114 may connect to the access networks 120 and 122 via respective customer edge (CE) routers 132, 134, 136, and 138. The access networks 120 and 122 may transmit and receive communications between the user endpoint devices 108, 110, 112, and 114, between the user endpoint devices 108, 110, 112, and 114, the server(s) 126, other components of the core network 102, devices reachable via the Internet in general, and so forth. In one example, each of the user endpoint devices 108, 110, 112, and 114 may comprise any single device or combination of devices that may comprise a user endpoint device, such as computing system 700 depicted in FIG. 7, and may be configured as described below. For example, the user endpoint devices 108, 110, 112, and 114 may each comprise a mobile device, a cellular smart phone, a gaming console, a set top box, a laptop computer, a tablet computer, a desktop computer, an application server, a bank or cluster of such devices, and the like.

In one example, one or more servers 126 and one or more databases 132 may be accessible to user endpoint devices 108, 110, 112, and 114 via Internet 124 in general. The server(s) 126 and DBs 132 may be associated with Internet content providers, e.g., entities that provide content (e.g., news, blogs, videos, music, files, products, services, or the like) in the form of websites (e.g., social media sites, general reference sites, online encyclopedias, or the like) to users over the Internet 124. Thus, some of the servers 126 and DBs 132 may comprise content servers, e.g., servers that store content such as images, text, video, and the like which may be served to web browser applications executing on the user endpoint devices 108, 110, 112, and 114 in the form of websites.

In accordance with the present disclosure, network performance parameters, such as latency, jitter, packet loss, congestion, and the like, may be exposed via border gateway protocol (BGP) updates to customer edge routers 132, 134, 136, and 138 and to user endpoint devices 108, 110, 112, and 114, as well as to other devices within the system 100. In one example, exposure of network performance parameters via BGP updates may be accomplished by sending a plurality of network probes (e.g., data packets) from the first provider edge router 128 to the second provider edge router 130. In one example, each network probe of the plurality of network probes may traverse a different path from the first provider edge router 128 to the second provider edge router 130. For instance, a first network probe may traverse the path a,b; a second network probe may traverse the path c,e,g; a third network probe may traverse the path c,d,f,g; a fourth network probe may traverse the path a,f,g; a fifth network probe may traverse the path c,d,b; and so on. In one example, one network probe may traverse every possible path from the first provider edge router 128 to the second provider edge router 130.

Upon receiving a network probe, the second provider edge router 130 may utilize known techniques to calculate a plurality of network performance parameters (e.g., latency, jitter, packet loss, congestion, and the like) that characterize the network probe's traveled path. These network performance parameters may be calculated, for example, using values in header fields of the network probe (e.g., time stamp fields, packet number fields, etc.). The second provider edge router 130 may store these network performance parameters in a path metric table (one example of which is illustrated in further detail in FIG. 3). The path metric table may include an entry for each path that is traversed by a network probe from the first provider edge router 128 to the second provider edge router 130. The entry for a path may identify the path, the network performance metrics that are calculated for the path, a community value (e.g., a BGP community value) assigned to the path, and a traffic classification value (e.g., a differentiated services code point (DSCP) value) assigned to the path.

Within this context, a "community value" refers to a numerical value that is assigned to a specific prefix and advertised to neighboring network elements and nodes. When a neighbor receives the prefix, the neighbor will take an action associated with the prefix and/or a community associated with the prefix (where the community may require, for instance, that packet routes not be advertised to internal and/or external peers, shut down of paths associated with specific routers, or other handling). One example of a community value is a BGP community value, as discussed above. Further, within this context, a "traffic classification value" refers to a value that indicates that a packet containing the value within the packet header should be handled in a specific manner (e.g., in accordance with differentiated services). A traffic classification value may be used to ensure, for instance, that handing of a given packet meets a required quality of service (QoS). A DSCP value is one example of a traffic classification value, as discussed above.

When an application executing on a user endpoint device 108 or 110 wishes to send a data packet to another user endpoint device 112 or 114, for example, the application may, via the respective customer edge router 132 or 134, call an application programming interface on the SDN controller 104 to request the path metric table. In response, the SDN controller 104 may extract the path metric table from the second provider edge router 130 and may publish the path metric table.

Once the user endpoint device 108 or 110 (or the respective customer edge router 132 or 134) has access to the path metric table, the application may determine the minimum network performance metrics that are needed to send the data packet to the another user endpoint device 112 or 114. In one example, the minimum network performance metrics may be dictated by a service level agreement (SLA) or other agreements between the user of the user endpoint device 108 or 110 and the Internet service provider that guarantees a certain quality of service (QoS). The application may identify the set of network performance metrics in the path metric table that most closely matches the minimum network performance metrics. The application may then identify a DSCP value that is mapped in the path metric table to the identified set of network performance metrics.

Subsequently, the application may insert the identified DSCP value into the header of the data packet and then send the data packet, via the respective customer edge router 132 or 134, to the first provider edge router 128. As shown in inset, the first provider edge router 128 may include a forwarding information base (FIB) with a DSCP extension 140 and an FIB DSCP 142. When the first provider edge router 128 receives the data packet, the FIB with DSCP extension 140 may scan the header of the data packet for a DSCP value within a predefined range of DSCP values. Assuming that the header of the data packet contains the DSCP value within the predefined range of DSCP values, then the FIB DSCP 142 may perform a DSCP match to match the DSCP value to a specific path connecting the first provider edge router 128 to the second provider edge router 130. For instance, the FIB DSCP 142 may look the DSCP value up in the path metric table in order to identify the corresponding path to which the DSCP value is mapped. Once the DSCP value is matched to a path, the FIB DSCP 142 may apply a label to the data packet that steers the data packet over the path. If the header of the data packet does not contain the DSCP value within the predefined range of DSCP values, the FIB with DSCP extension 140 may simply forward the data packet according to any conventional forwarding scheme.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth.

Moreover, FIG. 1 illustrates two provider edge routers (i.e., first provider edge router 128 and second provider edge router 130). However, the core network 102 may in practice include any number of provider edge routers (connected by any number of combinations of network links). Thus, the operations described above in relation to sending network probes, calculating network performance parameters, and storing network performance parameters in path metric tables may be performed for each pair of provider edge routers in the core network 102. Moreover, each provider edge router may be configured in a manner similar to the first provider edge router 128 (i.e., including a FIB with a DSCP extension and a FIB DSCP), and each provider edge router may be capable of computing network performance metrics and maintaining a respective path metric table. Thus, these and other modifications are all contemplated within the scope of the present disclosure.

Figure 2:
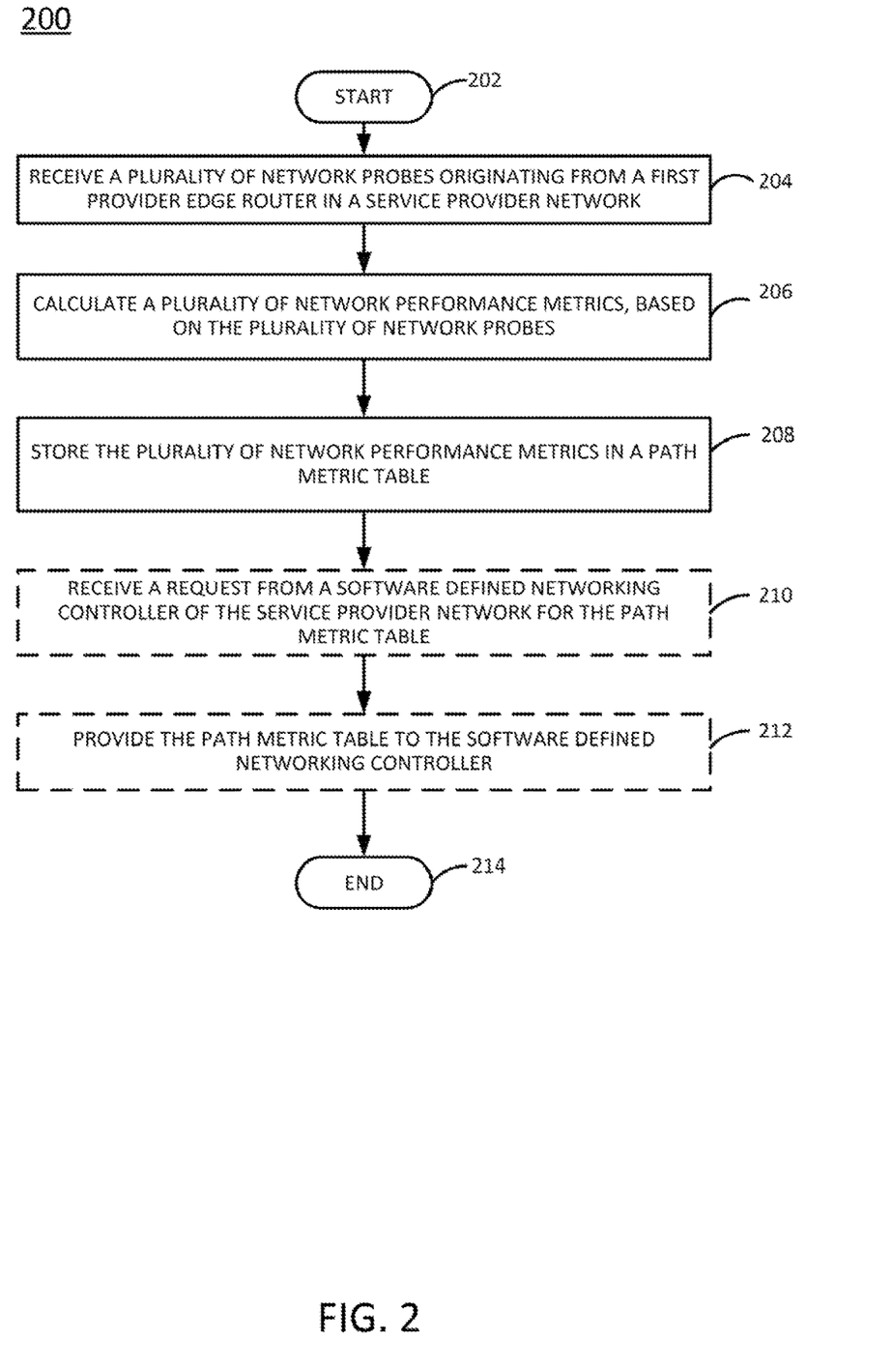
FIG. 2 illustrates a flowchart of an example method for encapsulating network performance metrics in border gateway protocol to support customer-driven path selection, according to the present disclosure.

To further aid in understanding the present disclosure, FIG. 2 illustrates a flowchart of an example method 200 for encapsulating network performance metrics in border gateway protocol to support customer-driven path selection. In one example, the method 200 may be performed by the second provider edge router 130 illustrated in FIG. 1. However, in other examples, the method 200 may be performed by another device, such as the computing system 700 of FIG. 7, discussed in further detail below. For the sake of discussion, the method 200 is described below as being performed by a processing system (where the processing system may comprise a component of the second provider edge router 130, the computing system 700, or another device).

The method 200 begins in step 202. In step 204, the processing system may receive a plurality of network probes originating from a first provider edge router in a service provider network. In one example, each network probe of the plurality of network probes may comprise one or more packets whose source is the first provider edge router and whose destination is the processing system. For instance, each packet that is part of a network probe may include a header and, optionally, a payload. The header may contain information such as a source IP address, a destination IP address, a time stamp indicating the time at which the packet was sent by the source, a packet number (e.g., indicating how many packets a particular network probe was split into and/or the place of the individual packet as a part of the complete network probe), and/or other information.

In one example, each network probe of the plurality of network probes may have traveled over a different combination of network segments in order to travel from the first provider edge router to the processing system. In one example, collectively, the plurality of network probes travel all possible combinations of network segments to travel from the first provider edge router to the processing system. In other words, every possible combination of network segments connecting the first provider edge router to the processing system may be traveled by at least one network probe.

In step 206, the processing system may calculate a plurality of network performance metrics, based on the plurality of network probes. In one example, the plurality of network performance metrics may include one or more of: latency, jitter, packet loss, congestion, and/or other metrics. Any of these network performance metrics may be calculated using information contained in the header of a packet that is part of a network probe. For instance, the processing system may calculate the latency of the network by subtracting a time indicated in a header time stamp of a packet that is part of a network probe from the time at which the processing system received the first byte of data of the packet. The processing system may calculate the jitter of the network by calculating the difference between the latencies of different packets that are part of the same network probe. The processing system may calculate the packet loss of the network by comparing a header packet number of a packet that is part of a network probe to a number of packets of the network probe that the processing system actually received. The processing system may calculate the congestion of the network by measuring the latency, jitter, and packet loss. For instance, high latency, jitter, and/or packet loss may indicate congestion.

In step 208, the processing system may store the plurality of network performance metrics in a path metric table. The path metric table may comprise a data structure that is locally stored and updated on the provider edge router (or another computing system) of which the processing system is a part.

Figure 3:
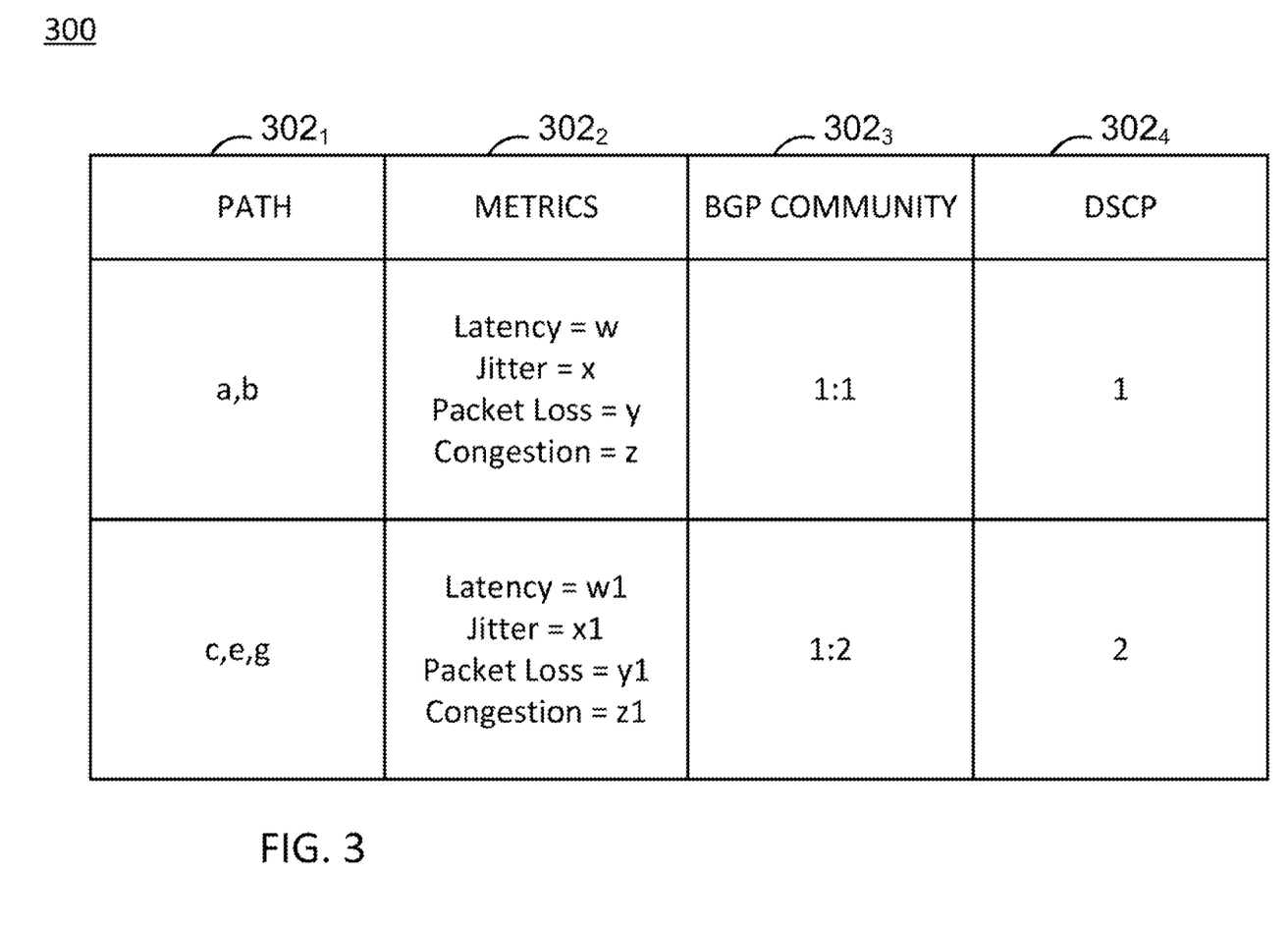
FIG. 3 illustrates one example of a portion of a path metric table according to examples of the present disclosure.

FIG. 3, for instance, illustrates one example of a portion of a path metric table 300 according to examples of the present disclosure. As illustrated, the path metric table may include a plurality of fields $302_1$-$302_4$ (hereinafter individually referred to as a "field 302" or collectively referred to as "fields 302"). The plurality of fields 302 may include a path field $302_1$ (identifying a specific combination of segments of the network that connects one network element or router to another network element or router), a metrics field $302_2$ (indicating the calculated network performance metrics for the specific combination of segments of the network indicated in the path segment field), a BGP community field $302_3$ (indicating a BGP community value that is uniquely associated with the specific combination of segments of the network), and a DSCP field $302_4$ (indicating a DSCP value associated with the specific combination of segments of the network). As discussed above, the metrics field $302_2$ may list a plurality of different network performance metrics for the corresponding path, including latency, jitter, packet loss, and congestion. Although FIG. 3 illustrates four fields 302 in the path metric table 300, it will be appreciated that the path metric table 300 may comprise any number of additional fields 302.

In optional step 210 (illustrated in phantom), the processing system may receive a request from a software defined networking controller of the service provider network for the path metric table. In one example, the request may be received via an application programming interface of the SDN controller.

In optional step 212 (illustrated in phantom), the processing system may provide the path metric table to the software defined networking controller. In one example, the path metric table that the processing system provides to the SDN controller is the most current path metric table (i.e., representing the most recently calculated network performance metrics.

The method may end in step 214.

Figure 4:
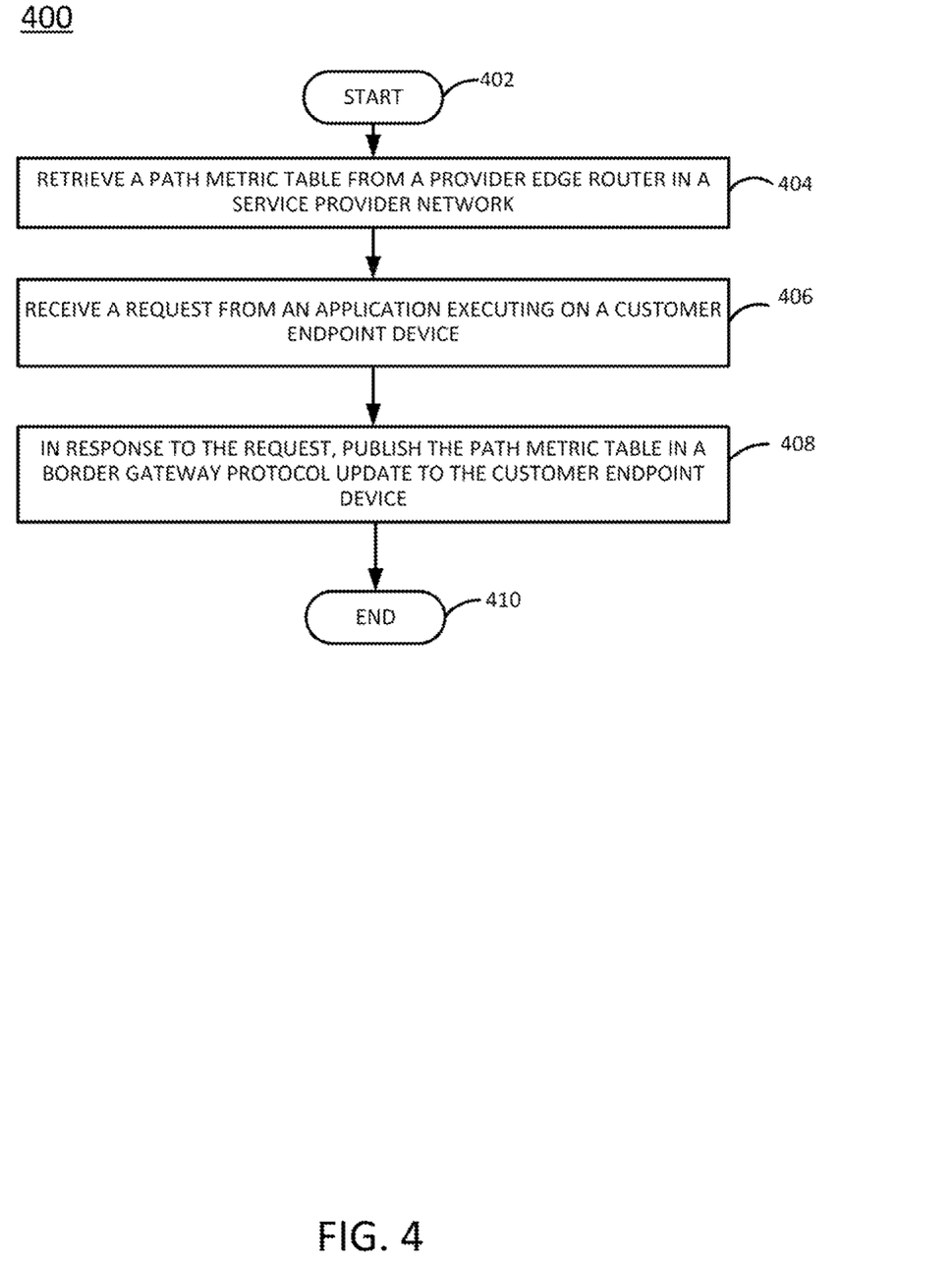
FIG. 4 illustrates a flowchart of an example method for encapsulating network performance metrics in border gateway protocol to support customer-driven path selection, according to the present disclosure.

FIG. 4 illustrates a flowchart of an example method 400 for encapsulating network performance metrics in border gateway protocol to support customer-driven path selection. In one example, the method 400 may be performed by the software defined networking controller 104 illustrated in FIG. 1. However, in other examples, the method 400 may be performed by another device, such as the computing system 700 of FIG. 7, discussed in further detail below. For the sake of discussion, the method 400 is described below as being performed by a processing system (where the processing system may comprise a component of the software defined networking controller 104, the computing system 700, or another device).

The method 400 begins in step 402. In step 404, the processing system may retrieve a path metric table from a provider edge router in a service provider network. In one example, the processing system may request the path metric table from the provider edge router via an application programming interface of an SDN controller (or another computing system) of which the processing system is a part.

As discussed above, the path metric table may include a plurality of fields. The plurality of fields may include a path field (identifying a specific combination of segments of the network that connects one network element or router to another network element or router), a metrics field (indicating the calculated network performance metrics for the specific combination of segments of the network indicated in the path segment field), a BGP community field (indicating a BGP community value that is uniquely associated with the specific combination of segments of the network), and a DSCP field (indicating a DSCP value associated with the specific combination of segments of the network). As discussed above, the metrics field may list a plurality of different network performance metrics for the corresponding path, including latency, jitter, packet loss, and congestion.

In step 406, the processing system may receive a request from an application executing on a customer endpoint device. The request may be received via a separate application programming interface of the SDN controller (or another computing device) of which the processing system is a part, and may comprise a request for network performance metrics. Alternatively, the request may comprise a routing request (e.g., a request to route a data packet from the customer endpoint device to another endpoint device in the network.

In step 408, the processing system may, in response to the request, publish the path metric table in a border gateway protocol update to the customer endpoint device.

The method 400 may end in step 410.

Figure 5:
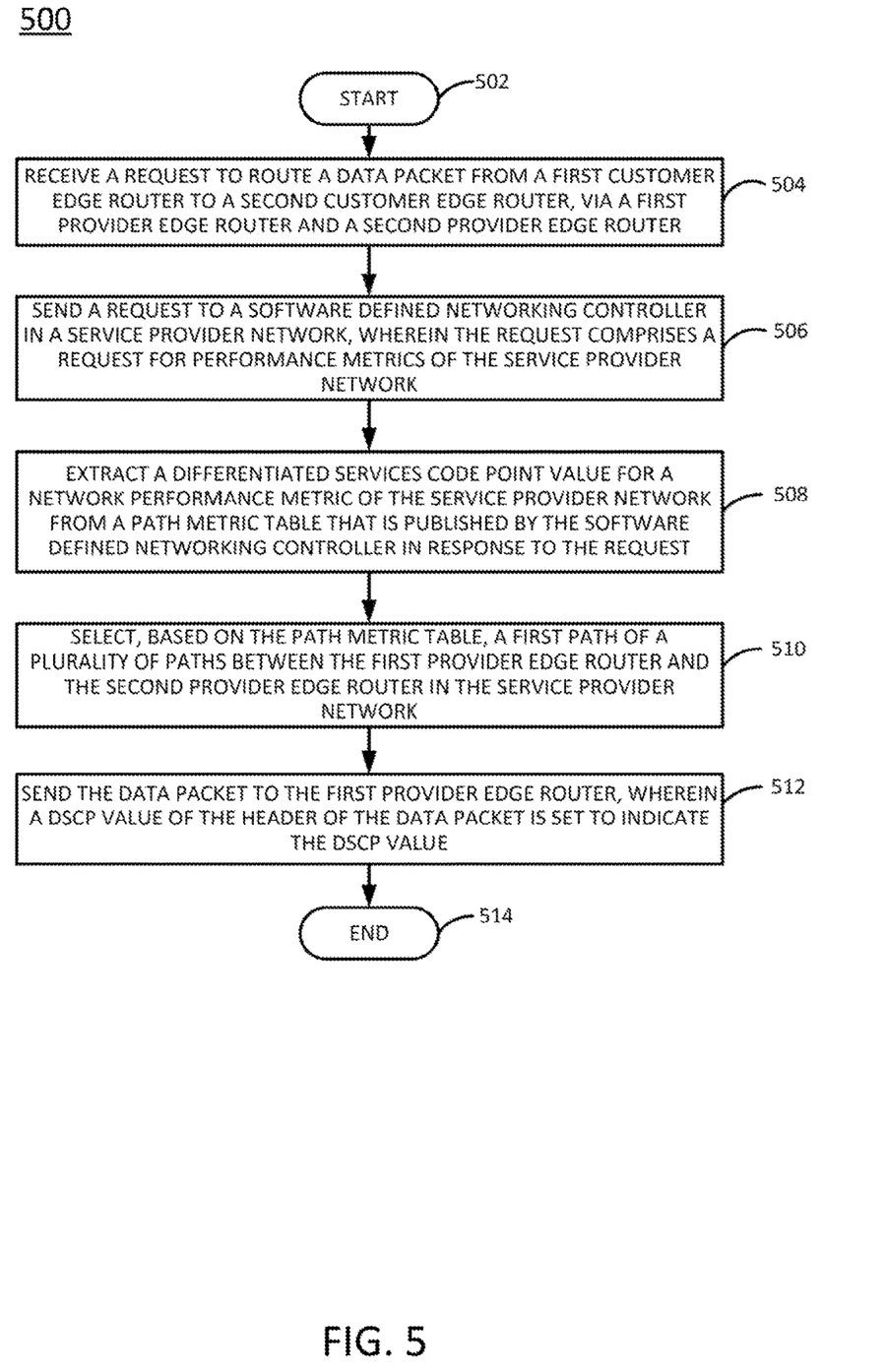
FIG. 5 illustrates a flowchart of an example method for encapsulating network performance metrics in border gateway protocol to support customer-driven path selection, according to the present disclosure.

FIG. 5 illustrates a flowchart of an example method 500 for encapsulating network performance metrics in border gateway protocol to support customer-driven path selection. In one example, the method 500 may be performed by one of the customer edge routers 132, 134, 136, or 138 illustrated in FIG. 1. However, in other examples, the method 500 may be performed by another device, such as the computing system 700 of FIG. 7, discussed in further detail below. For the sake of discussion, the method 500 is described below as being performed by a processing system (where the processing system may comprise a component of one of the customer edge routers 132, 134, 136, or 138, the computing system 700, or another device).

The method 500 begins in step 502. In step 504, the processing system may receive a request to route a data packet from a first customer edge router to a second customer edge router, via a first provider edge router and a second provider edge router. The first provider edge router and the second provider edge router may be situated between the first customer edge router and the second customer edge router in the network. In other words, the data packet may need to traverse both the first provider edge router and the second provide edge router in order to travel from the first customer edge router to the second customer edge router. In a further example, the data packet may need to further traverse one or more intermediate (or core) routers in order to travel from the first provider edge router to the second provider edge router.

In step 506, the processing system may send a request to a software defined networking controller in a service provider network, wherein the request comprises a request for performance metrics of the service provider network. In one example, the request may be sent via an application programming interface of the SDN controller.

In step 508, the processing system may extract a differentiated services code point value for a network performance metric of the service provider network from a path metric table that is published by the software defined networking controller in response to the request. As discussed above, the path metric table may comprise a data structure that is stored on and updated by the second provider edge router and published by the SDN controller in a BGP update.

As also discussed above, in one example, the path metric table may include a plurality of fields. The plurality of fields may include a path field (identifying a specific combination of segments of the network that connects one network element or router to another network element or router), a metrics field (indicating the calculated network performance metrics for the specific combination of segments of the network indicated in the path segment field), a BGP community field (indicating a BGP community value that is uniquely associated with the specific combination of segments of the network), and a DSCP field (indicating a DSCP value associated with the specific combination of segments of the network). As discussed above, the metrics field may list a plurality of different network performance metrics for the corresponding path, including latency, jitter, packet loss, and congestion.

In one example, a DSCP value may indicate a specific value to insert in the header of the data packet in order to have the data packet routed over a specific path exhibiting a corresponding set of network performance metrics. For instance, referring again to the path metric table 300 of FIG. 3, if a latency of w, jitter of x, packet loss of y, and congestion of z is desired for transmission of the data packet, then the DSCP value of "1" would be inserted in the header of the data packet. Thus, the DSCP value helps to classify the data packet and the quality of service (QoS) that is applicable to the data packet (and, in turn, to select the appropriate path by which to route the data packet from the first provider edge router to the second provider edge router).

In one example, the appropriate DSCP value to insert in the header of the data packet can alternatively be inferred from the low-order byte (i.e., right most integer) of the BGP community value that corresponds to the desired network performance metrics. For instance, the BGP community value associated with a latency of w, jitter of x, packet loss of y, and congestion of z in the path metric table 300 is "1:1." The low order byte of "1" matches the DSCP value of "1."

In step 510, the processing system may select, based on the path metric table, a first path of a plurality of paths between the first provider edge router and the second provider edge router in the service provider network. In one example, the first path is the path that corresponds, in the path metric table, to the DSCP value that is extracted in step 508.

In step 512, the processing system may send the data packet to the first provider edge router, wherein a DSCP value of the header of the data packet is set to indicate the DSCP value that is extracted in step 508. As discussed in greater detail below in connection with FIG. 6, setting the DSCP value of the header to the value that is extracted in step 508 will cause the first provider edge router to forward the data packet to the second provider edge router over the first path.

The method 500 may end in step 514.

Figure 6:
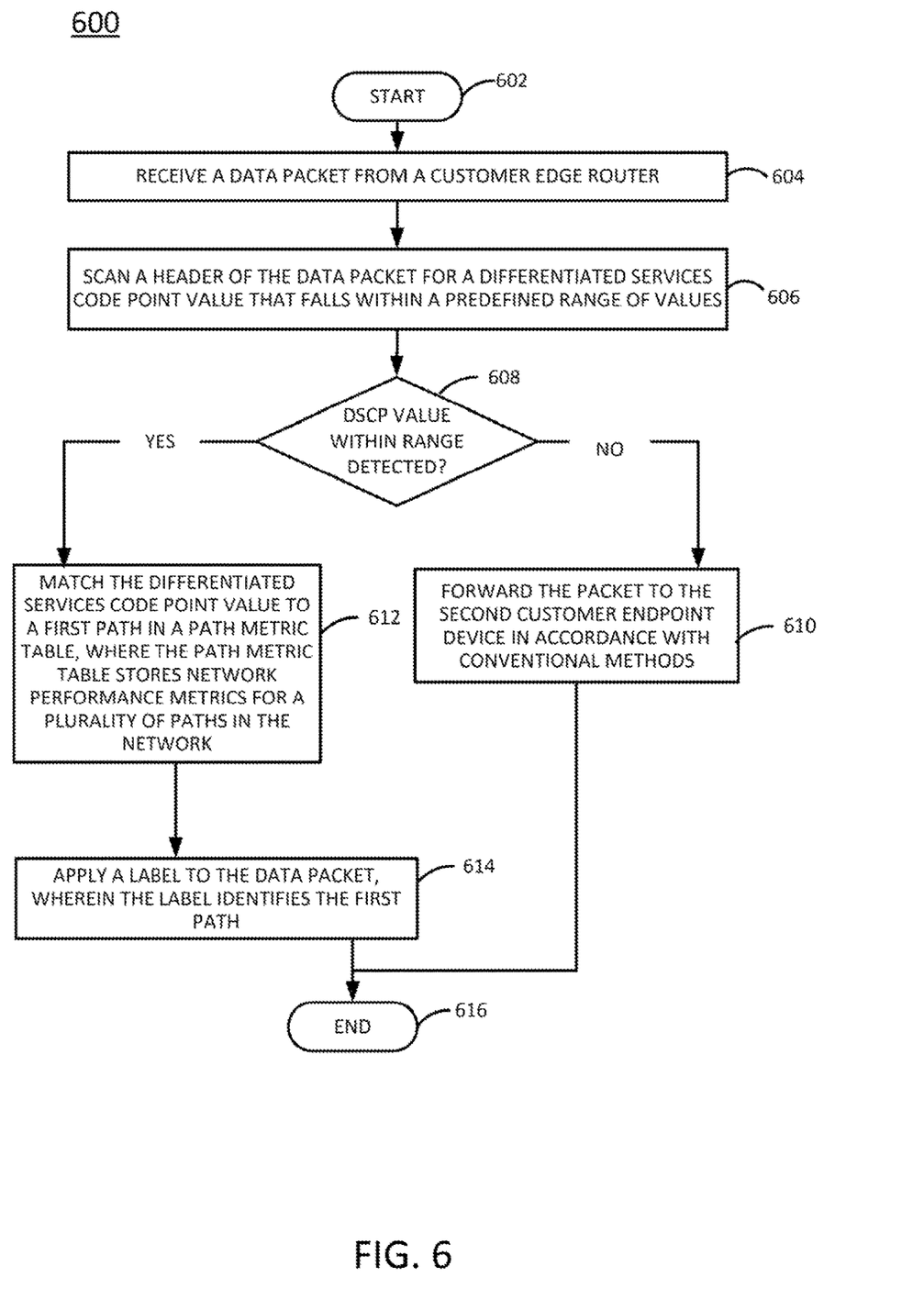
FIG. 6 illustrates a flowchart of an example method for encapsulating network performance metrics in border gateway protocol to support customer-driven path selection, according to the present disclosure.

FIG. 6 illustrates a flowchart of an example method 600 for encapsulating network performance metrics in border gateway protocol to support customer-driven path selection. In one example, the method 600 may be performed by the first provider edge router 128 illustrated in FIG. 1. However, in other examples, the method 600 may be performed by another device, such as the computing system 700 of FIG. 7, discussed in further detail below. For the sake of discussion, the method 600 is described below as being performed by a processing system (where the processing system may comprise a component of the first provider edge router 128, the computing system 700, or another device).

The method 600 begins in step 602. In step 604, the processing system may receive a data packet from a customer edge router. The data packet may have a first customer endpoint device as a source and a second customer endpoint device as a destination, and the customer edge router may have received the data packet from the first customer endpoint device.

In step 606, the processing system may scan a header of the data packet for a differentiated services code point value that falls within a predefined range of values.

In step 608, the processing system may determine whether the differentiated services code point value that falls within the predefined range of values is detected in the header of the data packet. In one example, the processing system may make this determination in accordance with a forwarding information base (FIB) that has been configured with a DSCP extension.

If the processing system determines in step 608 that the differentiated services code point value that falls within the predefined range of values is not detected in the header of the data packet (e.g., that the header contains no DSCP value, or contains a DSCP value that falls outside of the predefined range), then the method may proceed to step 610. In step 610, the processing system may forward the packet to the second customer endpoint device in accordance with one or more conventional methods before ending in step 616. In other words, the FIB with the DSCP extension may determine the proper output network interface controller of the device of which the processing system is a part (e.g., the first provider edge router or a computing system configured to function as the first provider edge router) to which the input interface of the device should forward the data packet according to one or more conventional methods.

If, however, the processing system determines in step 608 that the differentiated services code point value that falls within the predefined range of values is detected in the header of the data packet (e.g., that the header contains a DSCP value that falls inside of the predefined range), then the method may proceed to step 612. In step 612, the processing system may match the differentiated services code point value to a first path in a path metric table, where the path metric table stores network performance metrics for a plurality of paths in the network. As discussed above, the path metric table may include a plurality of fields. The plurality of fields may include a path field (identifying a specific combination of segments of the network that connects one network element or router to another network element or router), a metrics field (indicating the calculated network performance metrics for the specific combination of segments of the network indicated in the path segment field), a BGP community field (indicating a BGP community value that is uniquely associated with the specific combination of segments of the network), and a DSCP field (indicating a DSCP value associated with the specific combination of segments of the network). As discussed above, the metrics field may list a plurality of different network performance metrics for the corresponding path, including latency, jitter, packet loss, and congestion.

In one example, the processing system may match the differentiated services code point value to the first path in accordance with a FIB DSCP, which expands the forwarding information base to have an association with DSCP.

In step 614, the processing system may apply a label to the data packet, wherein the label identifies the first path. Applying the label to the data packet may also be performed in accordance with the FIB DSCP. Applying the label to the data packet allows the data packet to be steered onto the first path to which the DSCP value was matched in step 612. For instance, the label may cause the data packet to be forwarded to the output network interface controller (of the device of which the processing system is a part) associated with the first path (e.g., as opposed to being forwarded to an output network interface controller associated with a different path. In one example, a plurality of labels are available, where each label of the plurality of labels is associated with or assigned to a different path that the data packet may travel between provider edge routers of the service provider network.

The method 600 may end in step 616.

Although not expressly specified above, one or more steps of the methods 200, 400, 500, or 600 may include a storing, displaying, and/or outputting step as required for a particular application. In other words, any data, records, fields, and/or intermediate results discussed in the method can be stored, displayed and/or outputted to another device as required for a particular application. Furthermore, operations, steps, or blocks in FIGS. 2, 4, 5, and 6 that recite a determining operation or involve a decision do not necessarily require that both branches of the determining operation be practiced. In other words, one of the branches of the determining operation can be deemed as an optional step. Furthermore, operations, steps or blocks of the above described method(s)

can be combined, separated, and/or performed in a different order from that described above, without departing from the examples of the present disclosure.

Thus, end-to-end internal network performance metrics may be shared with customer devices (e.g., customer edge routers and customer endpoint devices), thereby allowing the customer devices to select the best paths to utilize for the transmission of particular data packets. The particular data packets may be associated, for instance, with a particular application that requires a particular QoS. In another example, exposing the network performance metrics to the customer devices may allow the customer devices to make more informed path selections and/or allow Internet service providers to incentivize the use of underutilized paths. For instance, an underutilized path that exhibits relatively high latency may be advertised as less costly (e.g., financially) for data packet transmission than paths with lower latencies. Thus, a customer may opt to use the less costly path, even though the latency may be higher, in order to save money. Moreover, the same customer device may execute a plurality of applications, and the plurality of applications may utilize different paths based on the priorities of the plurality of applications. For instance, an application whose performance is negatively impacted by time delays (e.g., a video streaming applications) may utilize a path with higher costs but lower latency and jitter, while an application whose performance is less impacted by time delays (e.g., a social media application) may utilize a path with lower costs but higher latency and jitter.

Figure 7:
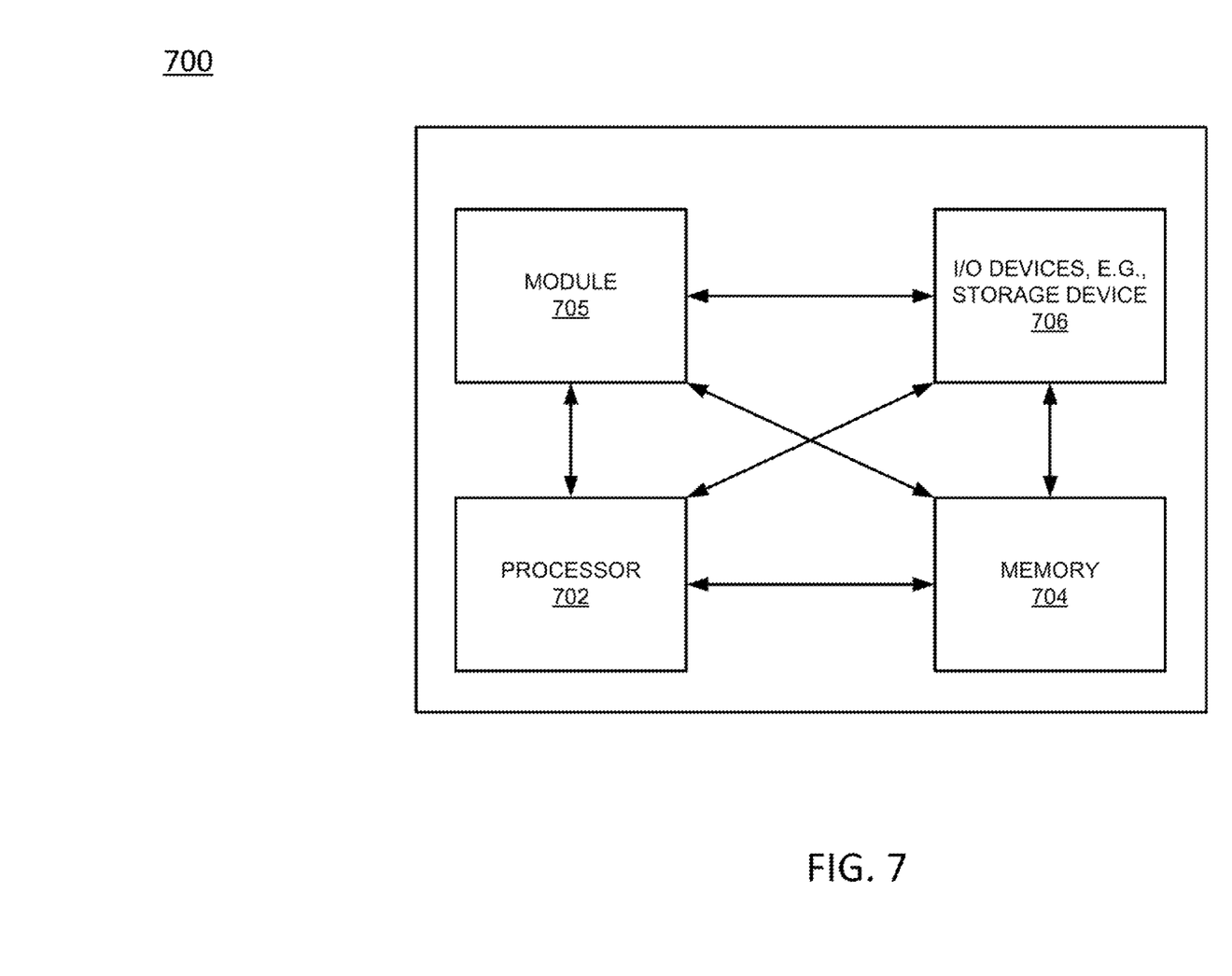
FIG. 7 illustrates a high-level block diagram of a computing device specifically programmed to perform the functions described herein.

FIG. 7 depicts a high-level block diagram of a computing device specifically programmed to perform the functions described herein. For example, any one or more components or devices illustrated in FIG. 1 or described in connection with the methods 200, 400, 500, or 600 may be implemented as the system 700. For instance, the second provider edge router 130 of FIG. 1 (such as might be used to perform the method 200), the SDN controller 104 of FIG. 1 (such as might be used to perform the method 400), the customer edge routers 132, 134, 136, and 138 of FIG. 1 (such as might be used to perform the method 500), or the first provider edge router 128 of FIG. 1 (such as might be used to perform the method 600), could be implemented as illustrated in FIG. 7.

As depicted in FIG. 7, the system 700 comprises a hardware processor element 702, a memory 704, a module 705 for encapsulating network performance metrics in border gateway protocol to support customer-driven path selection, and various input/output (I/O) devices 706.

The hardware processor 702 may comprise, for example, a microprocessor, a central processing unit (CPU), or the like. The memory 704 may comprise, for example, random access memory (RAM), read only memory (ROM), a disk drive, an optical drive, a magnetic drive, and/or a Universal Serial Bus (USB) drive. The module 705 for encapsulating network performance metrics in border gateway protocol to support customer-driven path selection may include circuitry and/or logic for performing special purpose functions relating to minimizing customer impact during network path selection. The input/output devices 706 may include, for example, storage devices (including but not limited to, a tape drive, a floppy drive, a hard disk drive or a compact disk drive), a receiver, a transmitter, a fiber optic communications line, an output port, or a user input device (such as a keyboard, a keypad, a mouse, and the like).

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 705 for encapsulating network performance metrics in border gateway protocol to support customer-driven path selection (e.g., a software program comprising computer-executable instructions) can be loaded into memory 704 and executed by hardware processor element 702 to implement the steps, functions or operations as discussed above in connection with the example method 200, 400, 500, or 600. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 705 for encapsulating network performance metrics in border gateway protocol to support customer-driven path selection (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:
1. A method comprising:
   receiving, by a processing system including at least one processor, a plurality of network probes originating from a first provider edge router in a service provider network;

calculating, by the processing system, a plurality of network performance metrics, based on the plurality of network probes; and storing, by the processing system, the plurality of network performance metrics in a path metric table, wherein an entry in the path metric table for each network probe of the plurality of network probes includes a path traveled by the each network probe from the first provider edge router to the processing system, a subset of the plurality of network performance metrics associated with the each network probe, a community value associated with the each network probe, and a traffic classification value associated with the each network probe, wherein a first customer edge router of the service provider network inserted the traffic classification value into a header of a data packet that is to travel through the first provider edge router to a second provider edge router of the service provider network, and wherein the processing system is a part of the second provider edge router.

2. The method of claim 1, wherein each network probe of the plurality of network probes comprises one or more data packets whose source is the first provider edge router and whose destination is the second provider edge router.

3. The method of claim 2, wherein each network probe of the plurality of network probes traverses a different path of a plurality of possible paths between the first provider edge router and the second provider edge router.

4. The method of claim 3, wherein each path of the plurality of possible paths is characterized by a different subset of the plurality of network performance metrics.

5. The method of claim 3, wherein the plurality of network probes collectively traverses all possible paths between the first provider edge router and the second provider edge router.

6. The method of claim 2, wherein the plurality of network performance metrics is calculated based on data contained in headers of the one or more data packets.

7. The method of claim 1, wherein the plurality of network performance metrics comprises at least one of: latency, jitter, packet loss, or congestion.

8. The method of claim 1, wherein the path metric table is stored locally on the second provider edge router.

9. The method of claim 1, further comprising:
receiving, by the processing system, a request from a software defined networking controller of the service provider network for the path metric table; and
providing, by the processing system, the path metric table to the software defined networking controller.

10. The method of claim 9, wherein the software defined networking controller publishes the path metric table in a border gateway protocol update.

11. The method of claim 1, wherein the traffic classification value is inserted into the header of the data packet when the first customer edge router determines that the data packet should traverse a first path based on a subset of the plurality of network performance metrics associated with the first path.

12. The method of claim 11, wherein, when the first provider edge router detects that the traffic classification value falls within a predefined range of traffic classification values, the first provider edge router applies a label to the data packet.

13. The method of claim 12, wherein the label identifies the first path and allows the data packet to be steered onto the first path.

14. The method of claim 12, wherein the label is one of a plurality of available labels, and each label of the plurality of available labels is associated with a different path from the first provider edge router to the second provider edge router.

15. The method of claim 1, wherein the data packet is associated with a first application executing on a user endpoint device connected to the first customer edge router, and wherein another application executing on the user endpoint device utilizes a different path to travel from the first provider edge router to the second provider edge router.

16. The method of claim 11, wherein the first path includes a plurality of network links and at least one intermediate router.

17. A non-transitory computer-readable medium storing instructions which, when executed by a processing system including at least one processor, cause the processing system to perform operations, the operations comprising:
receiving a plurality of network probes originating from a first provider edge router in a service provider network;
calculating a plurality of network performance metrics, based on the plurality of network probes; and
storing the plurality of network performance metrics in a path metric table, wherein an entry in the path metric table for each network probe of the plurality of network probes includes a path traveled by the each network probe from the first provider edge router to the processing system, a subset of the plurality of network performance metrics associated with the each network probe, a community value associated with the each network probe, and a traffic classification value associated with the each network probe, wherein a first customer edge router of the service provider network inserted the traffic classification value into a header of a data packet that is to travel through the first provider edge router to a second provider edge router of the service provider network, and wherein the processing system is a part of the second provider edge router.

18. An apparatus comprising:
a processing system including at least one processor; and
a computer-readable medium storing instructions which, when executed by the processing system, cause the processing system to perform operations, the operations comprising:
receiving a plurality of network probes originating from a first provider edge router in a service provider network;
calculating a plurality of network performance metrics, based on the plurality of network probes; and
storing the plurality of network performance metrics in a path metric table, wherein an entry in the path metric table for each network probe of the plurality of network probes includes a path traveled by the each network probe from the first provider edge router to the processing system, a subset of the plurality of network performance metrics associated with the each network probe, a community value associated with the each network probe, and a traffic classification value associated with the each network probe, wherein a first customer edge router of the service provider network inserted the traffic classification value into a header of a data packet that is to travel through the first provider edge router to a second provider edge router of the service provider network, and wherein the processing system is a part of the second provider edge router.

19. The non-transitory computer-readable medium of claim 17, wherein the traffic classification value is inserted into the header of the data packet when the first customer edge router determines that the data packet should traverse a first path based on a subset of the plurality of network performance metrics associated with the first path.

20. The apparatus of claim 18, wherein the traffic classification value is inserted into the header of the data packet when the first customer edge router determines that the data packet should traverse a first path based on a subset of the plurality of network performance metrics associated with the first path.

* * * * *